Sept. 26, 1950 L. F. MAYLE 2,523,315

SELECTIVE CALLING SYSTEM

Filed June 6, 1947 2 Sheets-Sheet 1

INVENTOR
LOUIS F. MAYLE
BY Arthur A. Smith
ATTORNEY

Sept. 26, 1950 L. F. MAYLE 2,523,315

SELECTIVE CALLING SYSTEM

Filed June 6, 1947 2 Sheets-Sheet 2

INVENTOR
LOUIS F. MAYLE
BY Arthur A. Smith
ATTORNEY

Patented Sept. 26, 1950 2,523,315

UNITED STATES PATENT OFFICE 2,523,315

SELECTIVE CALLING SYSTEM

Louis F. Mayle, Fort Wayne, Ind., assignor, by mesne assignments, to Farnsworth Research Corporation, a corporation of Indiana Application June 6, 1947, Serial No. 752,949

4 Claims. (Cl. 250—6)

This invention relates generally to remote control systems and particularly to a system for selectively calling remotely located radio receiving stations.

It is conventional practice to operate radio communication systems on a "general call" basis so that the transmitted information is simultaneously received by a plurality of receiving stations even though this information may be intended for a particular station only. Under these conditions every transmitted signal is heard by a large group of personnel, and the attention of the entire group is repeatedly attracted by these transmissions. It is further recognized that such repetitive transmissions eventually will dull the reactions of the listening personnel thus causing missed calls and the like, or a call may be acted upon by personnel for whom it was not intended.

Obviously greater efficiency will result from a communication system provided with selective calling apparatus whereby the transmitter operator may call only that particular receiving station he desires to contact while the other receiving stations of the system remain quiescent. Such a communication system will be particularly important if a particular one of a large number of receiving stations is to be selected.

Therefore, it is an object of the present invention to provide, in a radio communication system, apparatus for remote control whereby among a plurality of remotely located receiving stations may be selected and rendered operative by the transmitting station.

Another object of the present invention is to provide, in a radio communication system, remote control means whereby receiving stations normally adapted to be quiescent may be rendered operative only upon receipt of a specific control signal, or a combination of signals.

A further object of the present invention is to provide, in a radio communication system, a selective calling system wherein the receiver apparatus is not responsive to noise conditions such as lightning, static, or other interference.

In accordance with the present invention there is provided a selective calling system which comprises a transmitter including a source of a carrier wave, a source of control signals and a source of intelligence signals. Means are provided for modulating in succession the carrier wave in accordance with a first selected control signal, in accordance with a second selected control signal and in accordance with the intelligence signals. Means are further provided for radiating the carrier wave into space.

The selective calling system of the invention furthermore comprises a receiver which includes means for demodulating the carrier wave to derive the selected control signals and the intelligence signals. Normally inoperative means are provided for amplifying and reproducing the intelligence signals. There are further provided a first device responsive to a first predetermined control signal and second device which is normally inoperative and which is responsive to a second predetermined control signal. There are provided means for impressing the first control signal on the first device and for rendering the second device operative when the first device responds to the first predetermined control signal. Finally means are provided for impressing the second control signal on the second device and for rendering the intelligence signal amplifying and reproducing means operative when the second device responds to the second predetermined control signal. In this manner the intelligence signals are reproduced when the first and the second predetermined control signals are received in succession.

For a better understanding of the invention, together with other and further objects thereof, reference is made to the following description, taken in connection with the accompanying drawings, and its scope will be pointed out in the appended claims.

Figure 1:
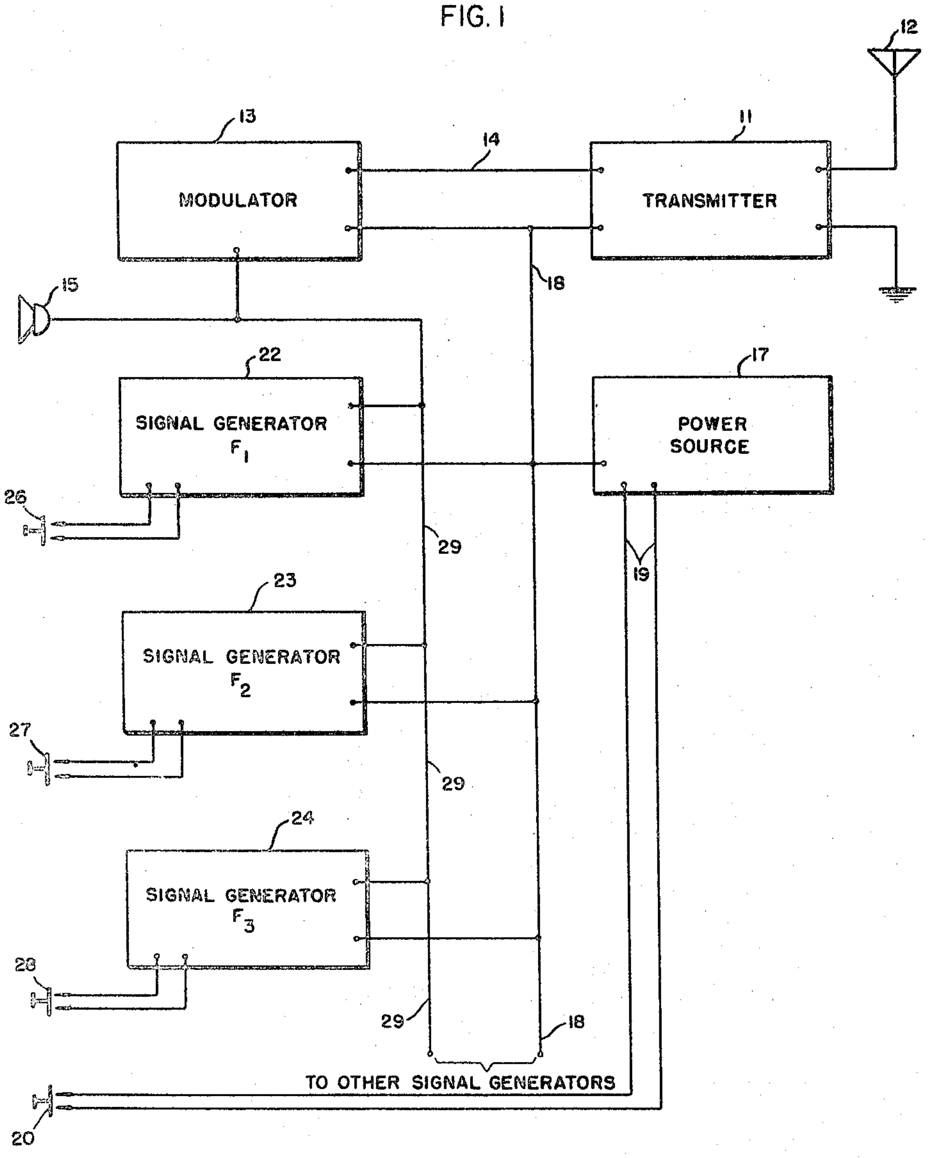
Fig. 1 illustrates in block diagram form a transmitter comprising signal generating apparatus for providing a modulated carrier wave in accordance with the present invention.

Referring now more particularly to Fig. 1 there is shown transmitting apparatus adapted for modulation by voice or other intelligence signals and by control tone signals. There is provided, for the generation of carrier signal energy, a transmitter 11 to which is coupled an antenna 12 for the space propagation of the carrier wave. A modulator 13 is coupled to the transmitter 11 by means of a conductor 14 whereby modulating signals may be impressed upon the carrier wave generated by the transmitter. Audio, such as voice signals, may be impressed on modulator 13 by means of a microphone 15. A power source 17 serves to provide operating potentials to the transmitter 11 and modulator 13 and is connected thereto by means of a conductor 18. A power switch 20 is connected by conductor pair 19 to the source 17 whereby power may be supplied to initiate the operation of the transmitter 11 and modulator 13. This transmitter arrangement is conventional in operation and requires no further explanation.

For the purpose of generating control tone signals which are applied to transmitter 11 there is provided a plurality of signal generators 22, 23 and 24. These generators may also be of conventional type and are individually adapted to develop control signals of different frequencies such as frequencies $F_1$, $F_2$ and $F_3$. Each generator is provided with a switch, such as switches 26, 27 and 28, whereby the operation of each generator may be initiated, or a plurality of generators may be sequentially initiated so as to provide an output signal comprising a series of control signal pulses. The output of these signal generators is coupled, by means of a conductor 29, to the modulator 13 whereby the control signals are amplified and impressed upon the transmitter 11 thereby to modulate the carrier signal generated therein. It is to be noted that additional signal generators may be coupled to the conductors 18 and 29 if additional control tone signals are required. The generated control signals may be of audible, sub-audible or supersonic frequency or may include any combination thereof.

It will be further noted, with respect to the manually operated switches 26, 27 and 28 that other mechanical switching devices may be substituted therefor, such as a telephone dial impulse switching arrangement whereby a plurality of signal generators may be sequentially operated so as to develop a series of control signal impulses. These control signals are applied to the transmitter 11 prior to the application of voice modulation signals whereby, in a remotely located receiving station, the control signals may effect certain selective switching operations prior to the reception of the signal intelligence.

Figure 2:
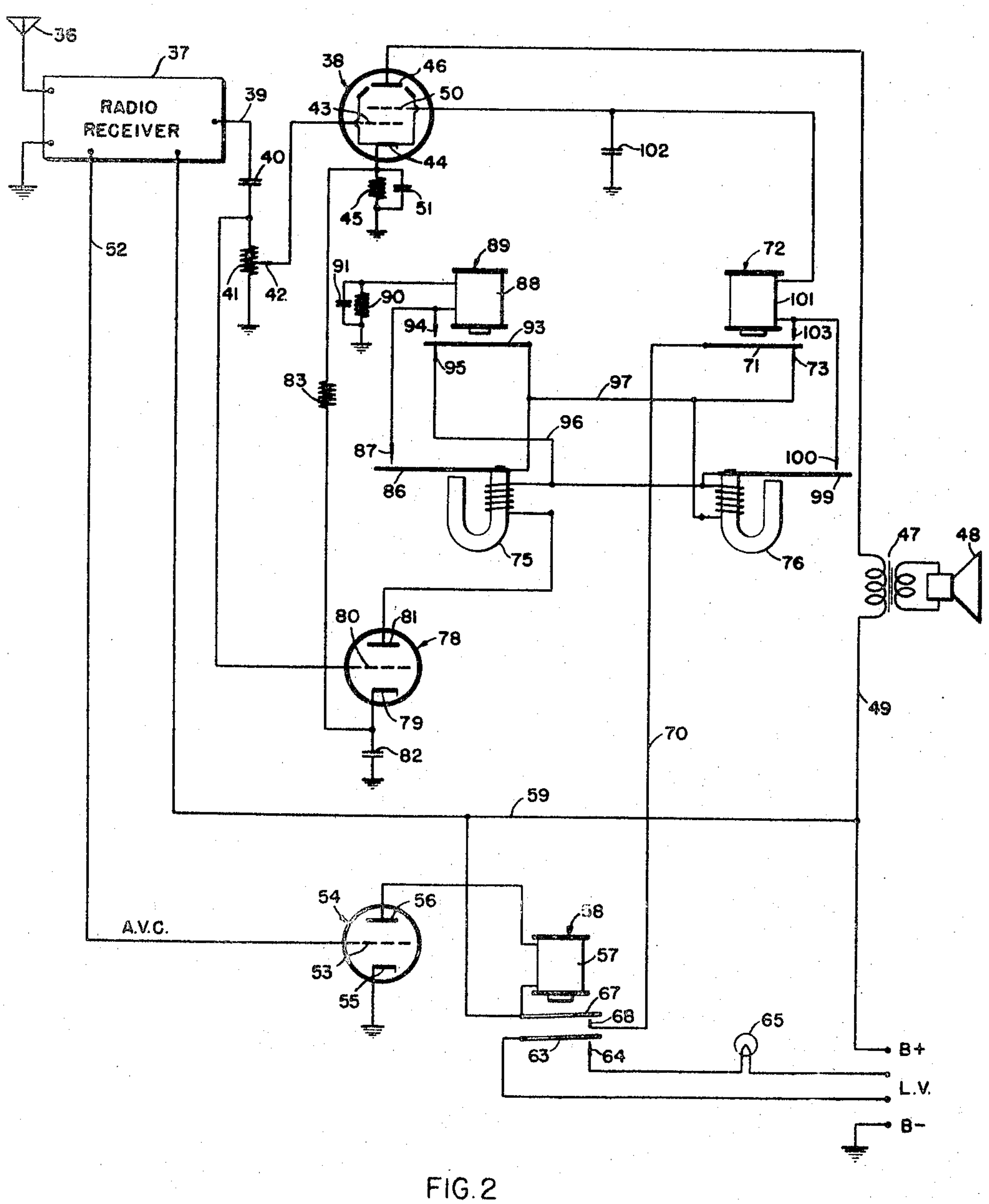
Fig. 2 is a partly schematic diagram of an embodiment of the present invention wherein receiver apparatus is adapted to be remotely controlled by certain control signals.

Referring now to Fig. 2, there is shown a receiver responsive to the previously described transmitter arrangement. There is further provided a selective switching circuit, the initiation of which is dependent upon resonant relay apparatus responsive to predetermined sequential control signals such as hereinbefore described.

For the interception of carrier signal energy there is provided an antenna 36 which is coupled to a receiver 37 the operation of which may be conventional in all respects. Its final audio amplifier tube 38 is shown for purposes of illustration. A conductor 39 applies audio output signals from receiver 37 to a coupling condenser 40. A volume control resistor 41 is connected between condenser 40 and ground. A movable contact arm 42 of the volume control potentiometer 41 is connected to control grid 43 of tube 38 whereby the amplitude of the audio signals applied to tube 38 may be controlled. The cathode 44 of tube 38 is connected to ground through a resistor 45 bypassed by a condenser 51. The anode 46 of tube 38 is conventionally coupled, by an output transformer 47, to a loud-speaker 48. Anode current for tube 38 is provided through the transformer 47 by conductor 49 which is terminated at a source of unidirectional high potential B+.

During standby periods, the receiver 37 will function to detect a certain, predetermined carrier signal. However, until such time that the carrier signal and a predetermined control signal modulation component is received, it is desirable that the audio output tube 38 be maintained in a nonconductive condition. Thus no audio signal reproduction may occur unless the selective apparatus is responsive to the predetermined control signal. The tube 38 is held in a substantially nonconductive condition. To this end its screen grid 50 floats because the high operating potential usually applied thereto is removed. It is well known that a beam power tube such as a 6V6 illustrated at 38, employing a self-biasing network, is rendered substantially nonconducting upon the removal of its screen potential, and that the tube will instantly revert to a conductive or operative condition upon the restoration of the screen potential.

A portion of the automatic volume control voltage generated by receiver 37 is applied to the control grid 53 of control tube 54, by means of a conductor 52. Cathode 55 of control tube 54 is connected to ground whereas the anode 56 is coupled, for providing space current, through the solenoid 57 of relay 58 to a conductor 59 which is connected to high potential source B+. The control tube 54 is normally conductive and will maintain the relay 58 in a normally energized condition thereby holding its associated switches open.

The control tube 54 is rendered nonconductive by the application of a biasing voltage to its grid 53. This biasing voltage is derived from the conventional automatic volume control voltage generated by the receiver 37 when it responds to a carrier signal.

When the control tube 54 is rendered nonconductive by this biasing voltage, its output current is reduced to such an extent that the solenoid 57 of relay 58 is de-energized. This is the first of four distinct steps for achieving selective operation of the receiver of the present invention. The remaining three steps, in sequence, comprise the application of a first predetermined control signal, the application of a second predetermined control signal and finally, the reproduction of the intelligence signal.

For the purpose of indicating at the receiver 37 that a carrier wave is radiated, the relay 58 is provided with switch members 63 and 64 which, when closed, will energize a "busy signal" indicator 65. The indicator 65 may comprise, for example, a lamp as illustrated which is connected to an appropriate source of potential indicated by the terminals L. V. by the closure of switch members 63 and 64. The indicator 65 is employed to apprise the receiving station personnel that the communication channel is occupied by a carrier wave. Cessation of the carrier wave will result in the removal of the biasing voltage applied to tube 54 which will again become conductive whereby relay 58 is energized causing its switch members 63 and 64 to be disconnected and the lamp 65 to be extinguished.

The relay 58 is further provided with switch members 67 and 68 which, when closed, connect the high potential conductor 59 to another conductor 70. The conductor 70 is connected to the movable switch arm 71 of a relay 72 which is normally conductively engaged with a fixed contact 73 whereby the high potential may be applied through the windings of resonant relays 75 and 76 to the anode of a control signal amplifier tube 78. Each resonant relay is responsive to a predetermined control signal.

The relays 75, 76 are arranged so that during standby periods the first resonant relay 75 short circuits the second resonant relay 76 thereby to render it inoperative as will be more fully explained hereinafter. Upon reception of the first control signal to which the first resonant relay 75 is responsive the aforementioned short circuit is removed, and the second resonant relay 76 is then placed in series with the first resonant relay 75 to utilize the second predetermined control signal. Upon actuation of the circuit associated with the second resonant relay 76 the signal intelligence is reproduced and the second resonant relay 76 is thereupon automatically disconnected so that the reception of intelligence signals will continue uninterrupted until the carrier signal ceases, whereupon the receiver and its associated selective switching circuits reverts to its quiescent standby condition as will be more fully described hereinafter.

The tube 78 serves to amplify the control signals and to impress them on the windings of resonant relays 75 and 76. Tube 78 is provided with a cathode 79, a control grid 80 and an anode 81 and is normally nonconductive during standby periods. The anode 81 is connected to conductor 70 through the windings of relays 75 and 76. Accordingly, as long as switch members 67 and 68 of the relay 58 are open, no operating potential is supplied to the anode 81. Space current is available at the anode 81 when switch members 67 and 68 close due to the de-energization of relay 58 resulting from the application of an automatic volume control bias voltage to tube 54.

The control signals are applied to the grid 80 of tube 78 by connecting it to the junction point between the audio coupling condenser 40 and volume control resistor 41. The cathode 79 of tube 78 is by-passed to ground by a condenser 82 and is further coupled through resistor 83 to the cathode 44 of the audio output tube 38. This connection prevents the cathode 79 and grid 80 of tube 78 from establishing undesired rectifying action across the audio input circuit during communication periods because cathode 79 is maintained at the potential of cathode 44 of audio amplifier 38 which will keep tube 78 at cutoff bias as long as audio amplifier 38 is conducting.

The anode circuit of tube 78 includes the windings of the first resonant relay 75 and of the second resonant relay 76 which are connected so that the relay 75 is at all times in series with anode 81 whereas the relay 76 is normally short circuited until the relay 75 is energized. The purpose of the first resonant relay 75 is to render the selective switching apparatus ready to respond to the second predetermined control signal. Thus, the second resonant relay 76 is rendered ready for operation by the energization of relay 75 and, if responsive to the second control signal radiated at the transmitter, will initiate a final switching action whereby the audio output tube 38 will be rendered operative for the reproduction of signal intelligence.

The resonant relay 75 is provided with a vibratory contact arm 86 responsive to a first predetermined control signal. When the first control signal is impressed on relay 75, its contact arm 86 will vibrate to intermittently engage with a fixed contact 87. The fixed contact 87 is connected to the solenoid 88 of a relay 89 which is connected to ground through a dissipative network comprising a resistor 90 by-passed by a condenser 91. The circuit parameters of the network 90, 91 are arranged to provide a substantial current surge through the solenoid 88 when an intermittent potential is applied thereto by the resonant relay contacts 86, 87 whereby the relay 89 is positively actuated. This energizing potential is supplied to the vibratory arm 86 through the conductor 70 which is connected thereto through the normally closed switch members 71 and 73 of the relay 72. The conductor 70 carries a potential, as hereinbefore explained, when the relay 58 becomes de-energized to close its switches 67, 68.

The relay 89 is provided with a movable switch arm 93 and a pair of fixed contacts 94 and 95. Energization of the solenoid 88 causes the movable arm 93 to engage with the fixed contact 94 whereby the same energizing potential which was heretofore intermittently applied is now continuously impressed on the solenoid 88. Thus the relay 89 which is initially triggered by the application of an intermittent potential will now remain energized.

For the purpose of short circuiting the resonant relay 76 and rendering it inoperative until the relay 89 is first energized, there are provided conductors 96 and 97. The conductor 96 connects the fixed contact 95 of relay 89 to the upper terminal of the winding of resonant relay 76 whereas the conductor 97 is provided between the movable switch arm 93 of relay 89 and the lower terminal of the winding of resonant relay 76. Thus during standby periods when the relay 89 is de-energized, its switch 93, 95 is closed whereby the winding of resonant relay 76 is shunted and thus rendered inoperative. However, the energization of relay 89 which, as previously described, is effected by the application of a first predetermined control signal to relay 75, will open switch 93, 95. The opening of switch 93, 95 places the resonant relay 76 in series with the first resonant relay 75. The second resonant relay 76 and its associated circuit are thus made responsive to the second predetermined control signal.

When the second control signal is received and impressed on the grid 80 of tube 78 the amplified signal appears in the circuit of the anode 81. The resonant relay 76 is now arranged in series with the anode 81, and the second control signal will cause the vibrating contact arm 99 of relay 76 to intermittently engage with a fixed contact 100. The fixed contact 100 is connected to one terminal of solenoid 101 of relay 72, the other terminal of which is connected to the screen grid 50 of the audio output tube 38 and by-passed to ground by a condenser 102. The initial application of the intermittent voltage from conductor 70 through the solenoid 101 tends to energize it. The voltage surge through the solenoid 101 is further increased by the charging of the condenser 102 and by the current requirements of the screen grid 50. This voltage surge through the relay 72 thereupon causes its movable switch arm 71 to break contact with the fixed contact 73 and to make contact with a fixed contact 103. Inasmuch as movable switch arm 71 has impressed thereon the unidirectional high potential of terminal B+, this potential will now be applied to the screen grid 50 and locks in the relay 72.

The audio output tube 38 is now rendered fully operative by the application of an operating potential to its screen grid 50. It will be understood that voice signals impressed on the carrier wave at the transmitter may now be passed through the audio output circuit of anode 46 for reproduction by the loud-speaker 48.

The opening of switch 71, 73 disconnects the high potential from conductor 97 thereby de-energizing the relay 89 and rendering inoperative the resonant relays 75, 76 and the tube 78. The resultant engagement of switch 93, 95 again short circuits the winding of resonant relay 76 through the conductors 97 and 96. The audio reproduction channel will remain responsive to the transmitted voice signals, until the transmitted carrier ceases. At that time the control tube 54 becomes conductive again causing the relay 58 to open its contacts 67 and 68 thereby removing the applied screen grid potential from the audio output tube 38 and de-energizing relay 72. The system now reverts to a quiescent condition to await the next call.

Referring now to the operation of the selective calling system of the instant invention, assume now that the operator at transmitter 11 wishes to communicate with a remote receiving station in which the selective apparatus is responsive to the control signal frequencies $F_1$ and $F_2$. The operator will first actuate power switch 20 to render operative the transmitter 11 and the modulator 13. An unmodulated carrier wave is now generated by the transmitter 11 and applied, for propagation purposes, to the antenna 12. The generation of a control signal pulse of frequency $F_1$ is accomplished by the momentary closure of the switch 26 whereby the signal generator 22 is energized to apply the control signal of frequency $F_1$ to the modulator 13 for a short duration. In turn, the modulator 13 impresses this control signal upon the carrier generated by transmitter 11 for modulation. After the tone signal pulse of frequency $F_1$ has been radiated, the operator will then momentarily actuate the switch 27 whereby the $F_2$ signal generator 23 is energized and a control signal impulse of frequency $F_2$ is similarly applied to the modulator 13 and impressed upon the carrier output of transmitter 11. The operator may now speak into microphone 15 whereupon the voice signals will be applied to the modulator 13 and impressed upon the carrier wave output of transmitter 11. At the end of the communication period the operator discontinues the radiation of the carrier wave by opening the power switch 20.

It is to be understood that various combinations of control signals may be employed to effect the selective calling operation at the remote point. While in this particular instance the operator has applied the control signals $F_1$ and $F_2$ to the carrier wave, in the sequence named, the receivers may also be selectively called by the sequential application of other combinations such, for example, as frequencies $F_1$ and $F_3$, or the frequencies $F_2$ and $F_3$. Thus a first group of receivers may be responsive to a first control frequency $F_1$ and another group of receivers may respond to a first control frequency $F_2$, and so forth. For calling a particular receiver in each group, a second control signal may then be selected to which only the desired receiver will respond.

At a plurality of remote receivers responsive to the carrier wave of the transmitter 11 the apparatus will generally be similar to that shown in Fig. 2 with the exception of the control signal frequency response of the resonant relays employed therein. In the receiver of Fig. 2 the resonant relays 75 and 76 are to be considered responsive to the control signal frequencies $F_1$ and $F_2$ respectively.

At the receiver 37 the incoming signals will be received in the same sequence as transmitted and will comprise, in this instance, a carrier wave, a first control frequency $F_1$, a second control frequency $F_2$ followed by voice modulation signals. These signals are employed, for selective purposes, in the same sequence whereby the relay 58, the resonant relay 75 and the resonant relay 76 will be rendered effective in the order named. These relays are so arranged as already described that the carrier wave will control the relay 58 whereas the control signal frequencies $F_1$ and $F_2$ are sequentially applied to the resonant relays 75 and 76 respectively.

Control tube 54 may be considered to be responsive to the carrier signal and serves to control the relay 58 whereas the tube 78 amplifies both the control signal frequencies $F_1$ and $F_2$ and impresses them on the resonant relays 75 and 76 which are arranged to be sequentially operated in the order named. Upon completion of the application of the second control signal which, in this instance, is the control frequency $F_2$, the audio output tube 38 will be rendered operative for the reproduction of the transmitted voice signals as has been described hereinbefore.

The energization of the relay 72 by the second control signal causes the switch 71, 73 of the relay 72 to open and removes the energizing potential previously applied to the relay 89 and to the anode 81 of tube 78. Relay 89 is thus de-energized and its movable arm 93 engages with the fixed contact 95 thereby again restoring the short circuit across the resonant relay 76. The removal of the anode potential from tube 78 renders the resonant relay circuits inoperative whereby the receiver may not again be initiated until the present communication is completed. In other words, the receiver and its selective apparatus is now conditioned only to reproduce the transmitted intelligence and is effectively locked against interruption in the form of control signals to which it may normally be responsive. Furthermore atmospheric discharges and static bursts cannot actuate relays 75 and 76. This novel result is achieved by rendering the control signal amplifier tube 78 inoperative during the time the audio output tube 38 is rendered operative for voice signal reproduction. During this time the only operative circuit in the selective apparatus is a series connection from the high potential source B+ to the screen grid 50 jointly maintained by the relays 58 and 72. In view of the high bias voltage applied to the cathode of the control signal amplifier tube 78, control grid 80 and cathode 79 of tube 78 cannot act as a diode rectifier of the audio signals impressed on control grid 80. The relay 58 now maintains the audio output tube 38 in an operative condition as long as the tube 54 remains nonconductive.

Thus at the end of the communication period when the carrier wave ceases, the absence of this carrier wave at receiver 37 causes the removal of the biasing voltage previously applied through the conductor 52 to the grid 53 of control tube 54. The control tube 54 is thereupon rendered conductive and its anode space current is supplied from conductor 59 through the solenoid 57 of relay 58 which again becomes energized. It will be immediately apparent that the opening of switch 67, 68 will remove the screen potential from audio amplifier tube 38 and will cause the de-energization of relay 72. The switch 71, 73 of the relay 72 will then engage thereby rendering the resonant relay circuit available for the next incoming control signal impulses. At the same time the de-energization of the busy signal indicator 65 informs the personnel at the receiver that the communication channel is clear.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a selective calling system, a receiver responsive to a carrier wave modulated in succession in accordance with a first control signal, a second control signal and audio signals, said receiver including means for demodulating said carrier wave to derive said control signals and said audio signals, means for amplifying said audio signals including a normally inoperative audio amplifier tube having input and output electrodes, means for reproducing said audio signals coupled to the output electrodes of said audio amplifier tube, a normally conducting control tube having input and output electrodes, means for developing in response to said carrier wave an automatic volume control signal and impressing it on the input electrodes of said control tube to render it nonconducting, a source of potential, means for impressing said demodulated signals between the input electrodes of said audio amplifier tube, a first relay connected in series between said source and the output electrodes of said control tube to be normally energized until said control tube becomes nonconducting, a first resonant relay responsive to a first predetermined control signal, a second resonant relay responsive to a second predetermined control signal, a normally nonconducting control signal amplifier tube having input and output electrodes, means for impressing said demodulated signals on the input electrodes of said control signal amplifier tube, said first relay being arranged upon de-energization to connect said first resonant relay in series with said source and the output electrodes of said control signal amplifier tube, whereby said first resonant relay will be energized upon reception of said first predetermined control signal, means coupled to said first resonant relay and operative upon energization thereof to connect said second resonant relay in series with said first resonant relay, said source and the output electrodes of said control signal amplifier tube, whereby said second resonant relay will be energized upon reception of said second predetermined control signal, means coupled to said second resonant relay and operative upon energization thereof to couple said source to said audio amplifier tube to render it operative and simultaneously to disconnect said source from said resonant relays and from the output electrodes of said control signal amplifier tube, and means coupled to said audio amplifier tube for biasing the input electrodes of said control signal amplifier tube beyond cutoff when said audio amplifier tube is rendered operative.

2. In a selective calling system, a receiver responsive to a carrier wave modulated in succession in accordance with a first control signal, a second control signal and audio signals, said receiver including means for demodulating said carrier wave to derive said control signals and said audio signals, means for amplifying and reproducing said audio signals including a normally inoperative audio amplifier tube having a cathode, a control grid, a screen grid and an anode, a source of potential, means for coupling said source between the cathode and anode of said audio amplifier tube, means for impressing said demodulated signals between the control grid and cathode of said audio amplifier tube, a first resonant relay responsive to a first predetermined control signal, a second resonant relay responsive to a second predetermined control signal, a first relay coupled to said first resonant relay and arranged to be energized upon energization of said first resonant relay, a second relay coupled to said second resonant relay and arranged to be energized upon energization of said second resonant relay, a normally nonconducing control signal amplifier tube having input and output electrodes, and means for impressing said demodulated signals on the input electrodes of said control signal amplifier tube, said first resonant relay being connected in series with said source and the output electrodes of said control signal amplifier tube, whereby said first resonant relay will be energized upon reception of said first predetermined control signal, said first relay being energized by said first resonant relay and arranged upon energization to connect said second resonant relay in series with said first resonant relay, said source and the output electrodes of said control signal amplifier tube, whereby said second resonant relay will be energized upon reception of said second predetermined control signal, said second relay being energized upon energization of said second resonant relay and arranged to connect said source to said screen grid to render said audio amplifier tube operative and simultaneously to disconnect said source from said second resonant relay and from the output electrodes of said control signal amplifier tube.

3. In a selective calling system, a receiver responsive to a carrier wave modulated in succession in accordance with a first control signal, a second control signal and audio signals, said receiver including means for demodulating said carrier wave to derive said control signals and said audio signals, means for amplifying and reproducing said audio signals including a normally inoperative audio amplifier tube having a cathode, a control grid, a screen grid and an anode, a normally conducting control tube having input and output electrodes, means for developing in response to said carrier wave an automatic volume control signal and impressing it on the input electrodes of said control tube to render it nonconducting, a source of potential, means for coupling said source between the cathode and anode of said audio amplifier tube, a cathode impedance in the cathode circuit of said audio amplifier tube, means for impressing said demodulated signals between the control grid and cathode of said audio amplifier tube, a first relay connected in series between said source and the output electrodes of said control tube to be normally energized until said control tube becomes nonconducting, a first resonant relay responsive to a first predetermined control signal, a second resonant relay responsive to a second predetermined control signal, a normally nonconducting control signal amplifier tube having a cathode, a control grid and an anode, means for interconnecting the cathodes of said control signal amplifier tube and of said audio amplifier tube, means for impressing said demodulated signals between the control grid and cathode of said control signal amplifier tube, said first relay being arranged upon de-energization to connect said first resonant relay in series with said source and the anode of said control signal amplifier tube, whereby said first resonant relay will be energized upon reception of said first predetermined control signal, relay means coupled to said first resonant relay and operative upon energization thereof to connect said second resonant relay in series with said first resonant relay, said source and the output electrodes of said control signal amplifier tube, whereby said second resonant relay will be energized upon reception of said second predetermined control signal, and relay means coupled to said second resonant relay and operative upon energization thereof to connect said source to said screen grid to render said audio amplifier tube operative and simultaneously to disconnect said source from said resonant relays and from the anode of said control signal amplifier tube, said cathode impedance being of such a value as to bias the control grid and cathode of said control signal amplifier tube beyond cutoff when said audio amplifier tube is rendered operative.

4. In a selective calling system, a receiver responsive to a carrier wave modulated in succession in accordance with a first control signal, a second control signal and audio signals, said receiver including means for demodulating said carrier wave to derive said control signals and said audio signals, means for amplifying and reproducing said audio signals including a normally inoperative audio amplifier tube having a cathode, a control grid, a screen grid and an anode, a normally conducting control tube having input and output electrodes, means for developing in response to said carrier wave an automatic volume control signal and impressing it on the input electrodes of said control tube to render it nonconducting, a source of potential, means for coupling said source between the cathode and anode of said audio amplifier tube, means for impressing said demodulated signals between the control grid and cathode of said audio amplifier tube, a first relay connected in series between said source and the output electrodes of said control tube to be normally energized until said control tube becomes nonconducting, a first resonant relay responsive to a first predetermined control signal, a second resonant relay responsive to a second predetermined control signal, a second relay coupled to said first resonant relay and arranged to be energized upon energization of said first resonant relay, a third relay coupled to said second resonant relay and arranged to be energized upon energization of said second resonant relay, a normally nonconducting control signal amplifier tube having input and output electrodes, means for impressing said demodulated signals on the input electrodes of said control signal amplifier tube, said first relay being arranged upon de-energization to connect said first resonant relay in series with said source and the output electrodes of said control signal amplifier tube, whereby said first resonant relay will be energized upon reception of said first predetermined control signal, said second relay being energized by said first resonant relay and arranged upon energization to connect said second resonant relay in series with said first resonant relay, said source and the output electrodes of said control signal amplifier tube, whereby said second resonant relay will be energized upon reception of said second predetermined control signal, said third relay being energized upon energization of said second resonant relay and arranged to connect said source to said screen grid to render said audio amplifier tube operative and simultaneously to disconnect said source from said resonant relays and from the output electrodes of said control signal amplifier tube, thereby to render said second and third relay and said resonant relays inoperative, and means coupled to said audio amplifier tube for biasing the input electrodes of said control signal amplifier tube beyond cutoff when said audio amplifier tube is rendered operative.

LOUIS F. MAYLE.

REFERENCES CITED

The following references are of record in the file of this patent:

UNITED STATES PATENTS

| Number | Name | Date |
|---|---|---|
| 1,740,833 | Ranger | Dec. 24, 1929 |
| 2,255,162 | Hart | Sept. 9, 1941 |
| 2,300,081 | White | Oct. 27, 1942 |
| 2,325,829 | Boswau | Aug. 3, 1943 |
| 2,340,798 | Deal | Feb. 1, 1944 |
| 2,361,585 | Appel | Oct. 31, 1944 |
| 2,361,653 | Roberts | Oct. 31, 1944 |
| 2,368,778 | Purington | Feb. 6, 1945 |
| 2,392,672 | Koch | Jan. 8, 1946 |
| 2,417,112 | Kettering | Mar. 11, 1947 |
| 2,431,167 | Byrnes | Nov. 18, 1947 |
| 2,457,730 | Roberts | Dec. 28, 1948 |

FOREIGN PATENTS

| Number | Country | Date |
|---|---|---|
| 433,286 | Great Britain | May 10, 1934 |